INVENTOR.
SAMUEL WITZ

United States Patent Office 3,751,340
Patented Aug. 7, 1973

3,751,340
METHOD FOR DETECTING THE PRESENCE AND CONCENTRATION OF HEME-CONTAINING PARTICLES AND HEAVY METAL IONS IN FLUID MEDIA
Samuel Witz, Los Angeles, Calif., assignor to Aerojet-General Corporation, El Monte, Calif.
Filed May 6, 1971, Ser. No. 140,685
Int. Cl. C12k 1/00
U.S. Cl. 195—103.5 R                 3 Claims

ABSTRACT OF THE DISCLOSURE

Disclosed is a method and apparatus for detecting, in fluid media, the presence and concentration of heme-containing particles, such as microorganisms, and heavy metal ions. The detection is accomplished by observing the light scattered by bubbles of oxygen formed by the catalytic decomposition of hydrogen peroxide by the ions or by the heme found in the particles. Microorganisms not naturally possessing heme may be detected by this method by preliminarily staining them with the enzyme catalase. The scattered light is detected by a photocell, the frequency and amplitude of whose output is a function of the concentration of the contaminant.

NOTICE OF GOVERNMENT RIGHTS

The invention herein described was made in the course of or under Contract Number DA–18–064–AMC–492(A) with the United States Department of the Army.

BACKGROUND OF THE INVENTION

(A) Field of invention

This invention relates generally to the detection of contaminants in gaseous or liquid media and more specifically to the detection of such contaminants which possess or can have imparted to them the capability of catalytically decomposing hydrogen peroxide.

(B) Description of prior art

There are many situations in which it is necessary to monitor the concentration of contaminants in fluid media. For example, in hospitals, laboratories and the like, the necessity of maintaining sterile conditions requires that the level of concentration of bacteria in the atmosphere be known at all times. Likewise, it is imperative that the concentration of microorganisms, such as $E.\ coli$, and heavy metal ions, such as ferrous or ferric ions, in city or laboratory water supplies be known. It is also necessary to know the bacterial and heavy metal ion concentration in sewage lines, both as a check on the effectiveness of sewage plants and as a means for monitoring the level of pollution in waste water discharged into our rivers and lakes.

Several methods exist for the detection of contaminants in fluid media which depend on the observation of oxygen generated from the catalytic decomposition of hydrogen peroxide by the contaminants. Typical of these are manometric, spectrophotometric and polarographic methods and those based on thermal conductivity or luciferase chemiluminescence. Such methods have been applied to the detection of heavy metal ions and the enzyme catalase, both of which possesses this catalytic property. Catalase is a natural constituent of most living matter, such as microorganisms, and contains heme (ferrous protoporphyrin), having the formula

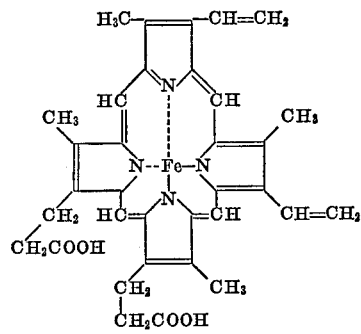

which is the catalytic factor.

However, none of these heretofore employed methods provides a simple, accurate means for monitoring the oxygen in a continuous and automatic or semi-automatic manner in the same liquid in which it is generated, i.e., without the need for chromatographic separations or the use of air-free systems, which are difficult to instrument for continuous operation.

SUMMARY OF INVENTION

Accordingly, it is an object of the present invention to provide an improved method for the detection, in a fluid medium, of microorganisms and other heme-containing particles, based on monitoring of the oxygen generated by the catalytic decomposition of hydrogen peroxide by the microorganisms or other particles, which is both simple and accurate in an automatic or semi-automatic monitoring system.

It is a further object of this invention to provide an apparatus which may be employed for the detection of microorganisms and other heme-containing particles by this method.

It is a still further object of the present invention to provide an improved method for the detection of heavy metal ions in a liquid medium, based on monitoring of the oxygen generated by the catalytic decomposition of hydrogen peroxide by the ions, which is both simple and accurate in an automatic or semi-automatic monitoring system.

It is a yet further object of this invention to provide an apparatus which may be employed for the detection of such ions by this method.

In the present invention, the fluid medium or the particulate matter suspended therein is introduced into a solution of hydrogen peroxide. Heavy metal ions or microorganisms (or other heme-containing particles) in the fluid medium, catalytically decompose the hydrogen peroxide, causing the evolution of oxygen bubbles. In the case of microorganisms, decomposition is catalyzed by catalase, an enzyme which is either naturally present in the microorganisms or is bonded to them by a preliminary staining procedure. The oxygen bubbles are detected by observing light scattered from them by means of a photocell whose output may be amplified and recorded.

Other objects, advantages and novel features of the invention will become apparent from the following detailed description of the preferred embodiments of the invention, when considered in conjunction with the accompanying drawing.

DESCRIPTION OF THE PREFERRED EMBODIMENTS

Figure 1:
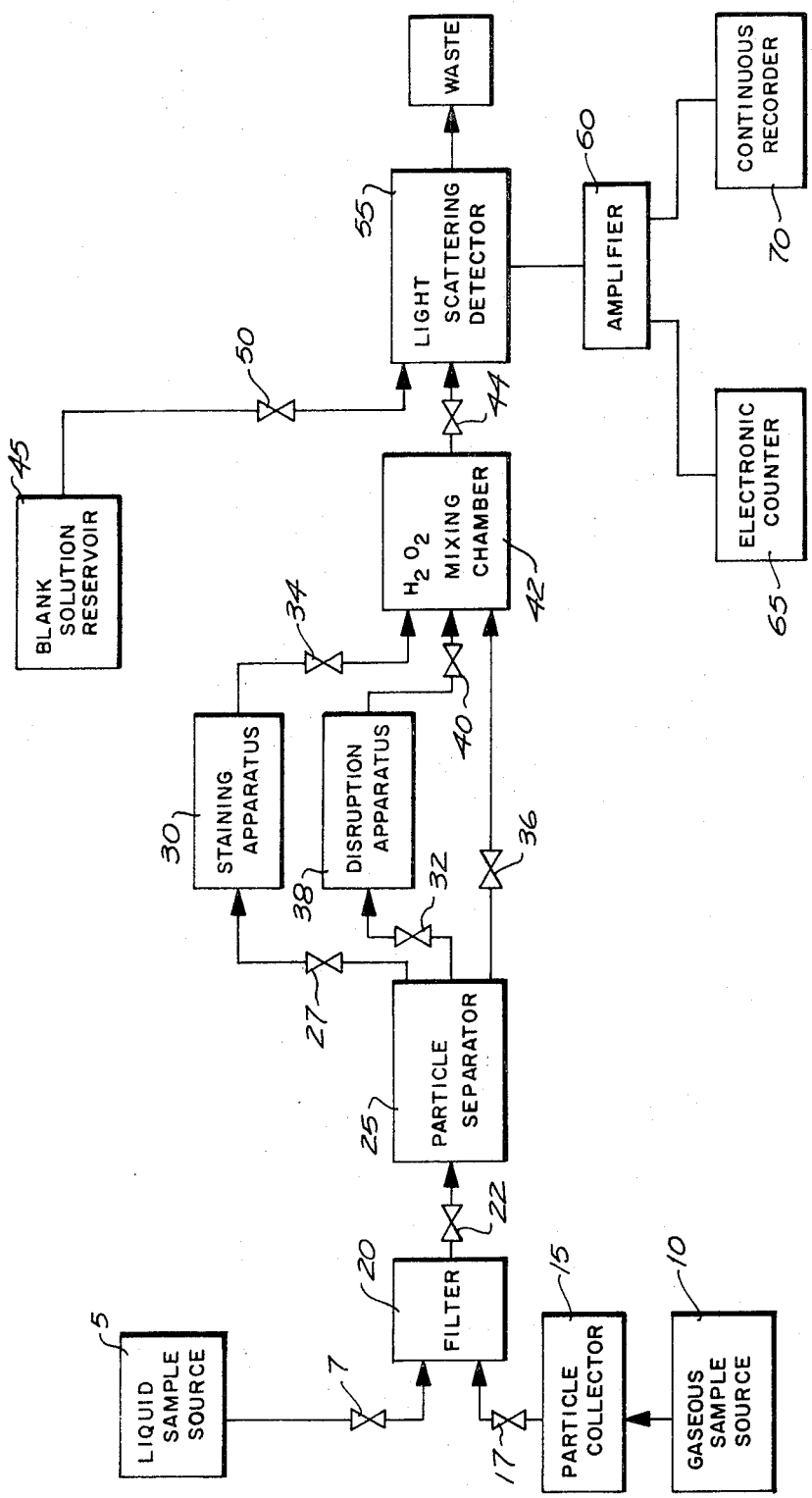
FIG. 1 represents a schematic diagram of the complete apparatus for the detection of microorganisms in a fluid sample.

Microorganisms may be detected in a fluid sample by means of the apparatus shown in FIG. 1. The fluid sample to be tested may comprise either a liquid sample or a gaseous sample. The liquid sample source 5 may be a continuous feed line, such as a city water supply or a sewage discharge line, or it may be a discreet test sample. Ordinarily, the liquid sample will comprise an aqueous suspension of particulate matter, such as soil, vegetative or animal refuse and microorganisms, such as protozoa or bacteria together with dissolved metallic salts.

The gaseous sample source 10 may likewise be a continuous source, such as an air duct, or a discreet volume of test gas. The gaseous sample must be passed through a suitable particle collector 15 whose function is to remove the particles suspended in the sample and resuspend them in a liquid medium for subsequent testing. The particle collector 15 may comprise a pump which draws the sample through a filter upon which the particles are collected. The particles collected on the filter are then suspended in a suitable liquid medium, such as water or phosphate buffered saline solution (PBS), by backwashing through the filter. As a typical application of the present invention will comprise continuous testing of the atmosphere for pollutants suspended therein, the pump utilized in drawing the sample through the filter may also be utilized in extracting the sample from the atmosphere.

The liquid sample is passed through a valve 7 into a suitable filter 20 to remove large particles from the suspension. Similarly, the liquid particulate suspension obtained from the particle collector 15 is passed through a valve 17 into the filter 20. The purpose of the filtration step is to remove particles whose size is such that they will interfere with the detection of oxygen bubbles by, themselves, scattering appreciable light. Thus, the filter 20 will have a pore size of the order of 5–10 microns, so as to pass only those particles of microorganic size. The large particles collected in the filter 20 are backwashed from the filter 20 and discarded.

The filtrate is then conducted through an automatic or manual valve 22 to a particle separator 25, which removes the suspended particles from the filtrate and resuspends them in a measured quantity of suitable liquid, such as water or PBS. It should be pointed out that while this step will often be desirable, is not essential in the testing of liquid samples, since in many cases the liquid sample will comprise a fairly high concentration of microorganisms suspended in water or another liquid soluble in water. However, this step would be desirable if the suspension medium were insoluble in water or the concentration of particles in the medium were very low. The particle separator 25 may comprise a filter (from which the particles would be backwashed with a suitable liquid, such as water or PBS), a centrifuge (the supernatant being discarded and replaced with water or PBS) or any other suitable device. The filtrate, possibly containing dissolved metallic salts which might interfere with the detection process, is discarded.

If the liquid sample or gaseous sample is known to contain only certain species of bacteria, all of which possess catalase the particle suspension from the particle separator 25 may be immediately passed through the valve 36 into the hydrogen peroxide mixing chamber. In the case where the method of this invention is used to monitor the growth of a laboratory culture, the composition of the bacterial flora will be known. However, it will often be the case that the particle suspension contains a mixture of unknown microorganisms.

It is well known that catalase is found in most aerobic and faculative anaerobic bacteria. Furthermore, it is also found in tissue cells which could serve as virus carriers. However, catalase is generally absent from obligate anaerobic bacteria. Furthermore, the location of the catalase in microorganisms varies with the organism. For example, in the case of the bacteria *Serratia marcescens*, the catalase is found near the surface, whereas in the case of *Bacillus globigii*, the catalase is concentrated in the interior of the organisms. Consequently, it is generally desirable to further treat the particle suspension prior to introducing it into the hydrogen peroxide mixing chamber 42. Various types of treatment can be applied with satisfactory results.

For example, in the case of microorganisms lacking natural catalase, the particle suspension from the particle separator 25 is passed through an automatic or manual valve 27 into a staining apparatus 30. The function of the staining apparatus is to bond catalase to the organisms. It is been found that virtually all protein substances, including microorganisms, stain well with catalase, the staining procedure simply comprising placing the sample in the catalase solution, collecting the stained sample, washing away the excess catalase with water or PBS and resuspending the sample in water, PBS or another suitable liquid medium. Cal Biochem bovine liver, Grade A, catalase is particularly satisfactory for this staining operation. Where the composition of the microorganic fluora in the particle suspension is unknown, this staining procedure is worthwhile, since some of the microorganisms may possess no catalase. The staining apparatus 30 may comprise a filter through which the particle suspension is drawn, together with means to introduce catalase into the sample before it passes through the filter and means for washing and resuspending the stained microorganisms. In particular, the staining apparatus 30 may be combined with the particle separator 25, in which case the influx to the particle separator 25 would be filtered or centrifuged, washed with catalase solution, further washed with water or PBS and back-washed with water or PBS to resuspend the particles.

In other cases, the composition of the contaminants in the liquid sample or gaseous sample will be known to consist solely of microorganisms in which the catalase is not concentrated near the surface. In this event, the microorganisms must somehow be disrupted so as to expose the catalase to the ambient, prior to introducing the particle suspension into the hydrogen peroxide mixing chamber 42. This procedure will not, of course, be necessary in the case where the microorganisms have been stained by means of the staining apparatus 30. However, since in most cases the exact composition of the particulate contaminants in the liquid sample or gaseous sample will not be known, it is worthwhile to pass the particle suspension from the particle separator 25 through the valve 32 into the disruption apparatus 38, in all cases where the suspension has not been passed through the staining apparatus 30. The disruption apparatus 38 may comprise any means for mechanically disrupting the surface of the organisms to expose the constituent catalase to the ambient. Thus, it may comprise a sonicator which will fracture the surface of the organisms by means of high frequency sound waves. Similarly, the disruption apparatus 38 may comprise a French cell, a device containing a partition having a minute orifice, through which the sample is forced in a high velocity stream and, thus, violently agitated. In addition, the disruption apparatus 38 may comprise a Mickle disintegrator, in which a high velocity stream of neutral particles, such as minute glass beads, are caused to bombard the sample and disrupt the surface of the organisms.

Thus, prior to their introduction into the hydrogen peroxide mixing chamber 42, all microorganisms in the sample will contain catalase available for the catalytic decomposition of the hydrogen peroxide. The suspension is either passed directly through the valve 36 from the particle separator 25 to the hydrogen peroxide mixing chamber 42, through the valve 34 from the staining apparatus 30 to the hydrogen peroxide mixing chamber 42, or through the valve 40 from the disruption apparatus 38 to the hydrogen peroxide mixing chamber 42. The latter may comprise a flask or any more sophisticated mixing apparatus, and contains an aqueous solution of hydrogen peroxide having a hydrogen peroxide concentration of approximately 3%. The ratio of particle suspension to hydrogen peroxide in the final hydrogen peroxide suspension is not critical, although it must be a rather precise ratio, for calibration purposes.

The catalase present on the surface of the microorganisms in the hydrogen peroxide suspension will catalytically decompose the hydrogen peroxide in the suspension, by the formula:

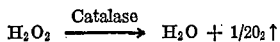

$$H_2O_2 \xrightarrow{\text{Catalase}} H_2O + 1/2O_2 \uparrow$$

The bubbles of oxygen thus generated, will be held in the hydrogen peroxide suspension, which is passed through a valve 44 into the light scattering detector 55. The sensitivity of the detection is increased by delaying the passage of the bubbles and thus allowing increased bubble formation.

Prior to the testing of the suspension in the light scattering detector 55, it is wise to calibrate this apparatus. Calibration is accomplished by passing one or more blank solutions from the blank solution reservoir 45 through a valve 50 into the light scattering detector 55, and observing the ground level output either on the electronic counter 65 or by means of the continuous recorder 70. This blank solution will ordinarily comprise a mixture of an aqueous solution of hydrogen peroxide, having a 3% hydrogen peroxide concentration and PBS or water (whichever the particles from the particle separator 25 are suspended in). I.e., the blank solution will be identical to the hydrogen peroxide suspension, except that it will lack any suspended particles. Alternatively, the blank solution may comprise a suspension identical to the hydrogen peroxide suspension to be monitored, except that the blank suspension contains a known concentration of a particular catalase-bearing microorganisms or catalase, itself. Upon calibration of the light scattering detector 55, a quantity of the hydrogen peroxide suspension is metered into the detector, at a prescribed rate, through the valve 44.

Figure 3:
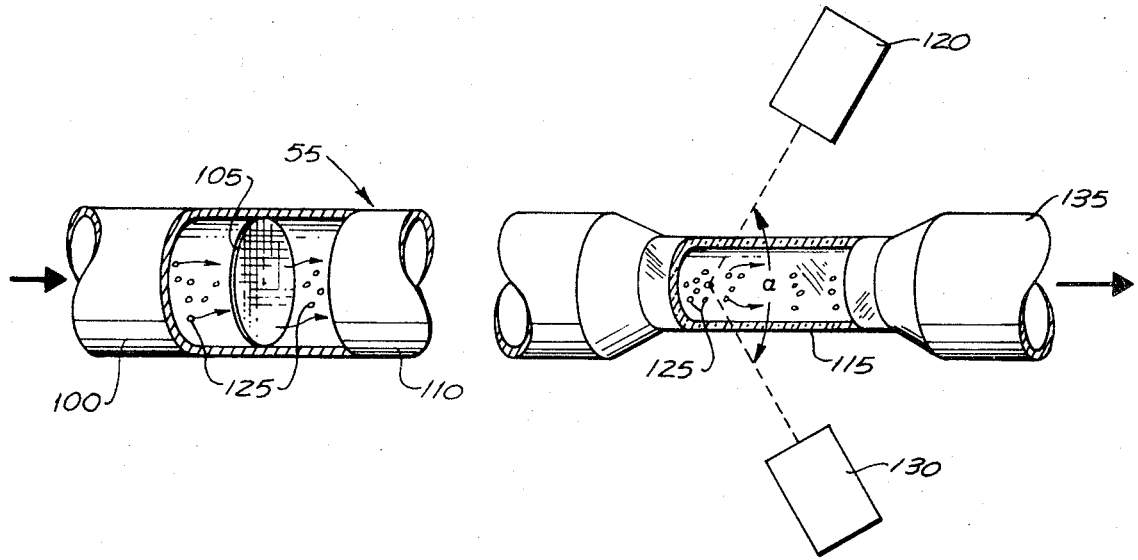
FIG. 3 represents a schematic diagram of the light scattering detector indicated in FIGS. 1 and 2.

As shown in FIG. 3, the light scattering detector 55 comprises an inlet tube 100 which conducts the hydrogen peroxide suspension through a fine mesh stainless steel sieve 105. The function of the latter is to increase the detection sensitivity by breaking up the larger bubbles and also by providing sites for bubble nucleation. The test suspension is then passed through the conduit 110 to the transparent test cell 115.

The test is conducted by directing a beam of light from a light source 120 toward the test cell 115. The bubbles 125 in the hydrogen peroxide suspension will scatter the light beam. Light scattered in a cone whose axis is at an angle $\alpha$ with respect to the beam transmitted from the light source 120 is detected by the photocell 130. This angle $\alpha$ may be any angle greater than zero and equal to or less than 180°, an angle of 90° being ordinarily employed. If $\alpha$ is 180°, the photocell will detect the transmitted light.

Since all particles in the liquid sample or gaseous sample large enough to scatter a detectable amount of light will have been removed by the filter 20, all scattered light detectable by means of the photocell 130 will have been scattered by bubbles in the hydrogen peroxide suspension. Of course, if no catalase is present in the influx to the hydrogen peroxide mixing chamber 42, no decomposition of hydrogen peroxide will have taken place and no oxygen bubbles will be present in the test cell to cause a scattering of light.

The amplitude of a particular pulse from the photocell 130 is a function of the diameter of the bubble 125 which scattered the light corresponding to that pulse. Furthermore, since a direct relationship has been found to exist between the number of organisms of a particular species in the hydrogen peroxide suspension and the number of bubbles of a particular size range generated, the number of pulses of a particular amplitude range from the photocell 130 will be a direct function of the number of such microorganisms passing through the test cell 115. Standard curves for various bacteria species may be employed for calibration purposes. Thus, since the quantity of test suspension passing through the test cell 115, the quantity of liquid sample or gaseous sample originally collected and the quantities of water or PBS utilized in the various steps in the complete detection process are known, it is possible from observing the output from the photocell 130 to calculate the concentration of such microorganisms in the liquid sample or the gaseous sample. As shown below, this calculation and many others may be made automatically by means of appropriate electronic circuitry in the recording apparatus.

The signal from the photocell 130 is amplified by the amplifier 60 and recorded on a suitable recording apparatus, such as an electronic counter 65 or a continuous recorder 70. In a manner familiar to those skilled in the electronic art, circuitry may be incorporated in the electronic counter so that the instrument will respond to and record only pulses within a discreet range of amplitudes (corresponding to bubbles within a discreet range of diameters). Similiarly, since, from the frequency of pulses from the photocell 130 and other known quantities, it is possible to calculate the concentration of microorganisms in a given quantity of hydrogen peroxide suspension (or in the original liquid sample or gaseous sample), suitable circuitry may be employed to cause the electronic counter 65 to display a value equal to the concentration of microorganisms in a particular quantity, of liquid sample or gaseous sample. Thus, if the apparatus of this invention were employed in an automatic mode, continuously extracting samples from a particular source and processing them, the electronic counter 65 could be made to continuously display the general level of contamination in the source, as the composition of the source continuously changes.

Ordinarily, the output from the continuous recorder 70 will be a strip chart calibrated to display the amplified output from the photocell 130 as a continuous trace of bubble diameter v. time. However, in like manner to the electronic counter 65, the signal recorded on the strip chart could be electronically processed to yield a strip chart displaying a continuous trace of average microorganism concentration v. time, i.e., a permanent record of the values displayed on the electronic counter 65.

Upon passing through the test cell 115, the hydrogen peroxide suspension enters the discharge tube 135, from which it is discarded.

It is important to point out that the process of this invention may be conducted manually, or automatically or semi-automatically by means of the apparatus hereinabove described and shown schematically in FIG. 1 and FIG. 3. In manual operation, a discreet liquid sample or a discreet gaseous sample is processed, as described above, in each of the various steps in the sequence, and the final hydrogen peroxide suspension is hand-metered into the light scattering detector 55 by means of a syringe or similar device.

However, the apparatus may be constructed so as to conduct the entire detection process automatically or semi-automatically. This is accomplished by providing means to automatically collect the liquid sample or the gaseous sample and to pump it through the apparatus shown schematically in FIG. 1, comprising the particle collector 15, filter 20, particle separator 25, staining apparatus 30, disruption apparatus 38, hydrogen peroxide mixing chamber 42 and light scattering detector 55, suitably connected with appropriate fluid conduit means, with valves and pumping apparatus (not shown) adapted to operate in a programmed manner. Likewise, the light scattering detector 55 may be periodically calibrated with blank solution pumped from the blank solution reservoir 45 in a programmed manner. The exact nature of this automatic or semi-automatic apparatus will be clear to those skilled in the art from the description herein provided. In this automatic or semi-automatic mode, the apparatus of this invention may be employed to continuously monitor the concentration of microorganisms in a fluid line, such as a sewage line, city water supply or air duct.

From the above discussion, it will be clear to those skilled in the art to which this invention pertains how this invention may be adopted for the detection of heme-containing materials other than microorganisms, such as hemoglobin, myoglobin, hematin or the like.

Figure 2:
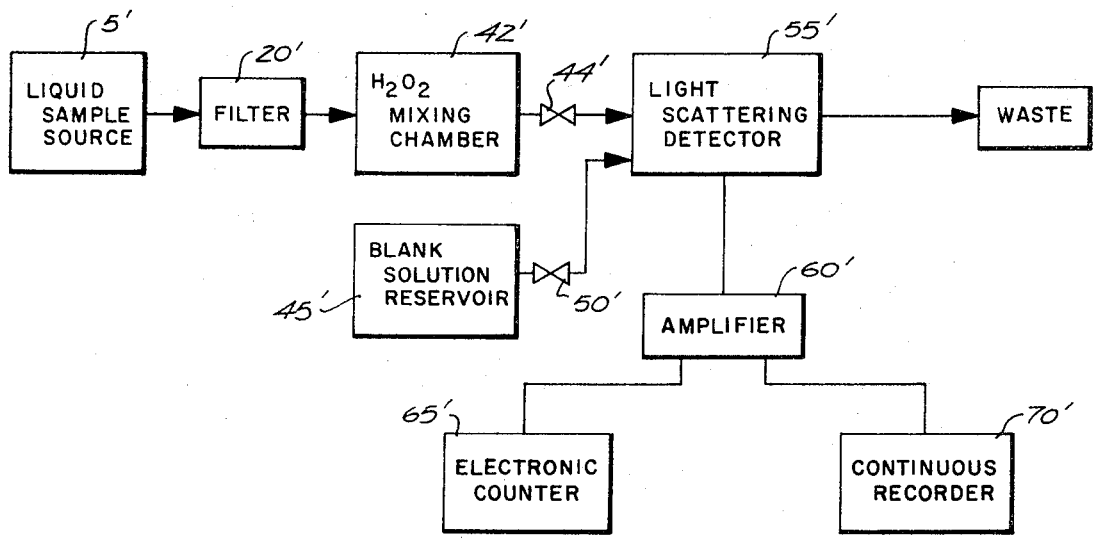
FIG. 2 represents a schematic diagram of the complete apparatus for the detection of heavy metal ions in a liquid sample.

FIG. 2 shows an alternative embodiment of the apparatus of this invention, for use in detecting the concentration of heavy metal ions, such as ferrous or ferric ions, in an aqueous solution. Specifically, the ions detectable by this method are those which catalyze the decomposition of hydrogen peroxide. The liquid sample from the liquid sample source 5' is first passed through the filter 20', which must be fine enough to remove all particles, such as microorganisms, which might contain catalase or any other particulate catalysts for the decomposition of hydrogen peroxide. The trapped particles are backwashed from the filter 20' with water or PBS and discarded. The filtrate is then mixed, in the hydrogen peroxide mixing chamber 42', with an aqueous hydrogen peroxide solution having a hydrogen peroxide concentration of approximately 3%. The light scattering detector 55' is calibrated with a blank solution, comprising a 3% aqueous hydrogen peroxide solution or such a solution containing a known heavy metal ion concentration, which is metered from the blank solution reservoir 45' into the light scattering detector 55' through a valve 50'. Upon calibration, the sample solution is metered through a valve 44' into the light scattering detector 55', where oxygen bubble monitoring is accomplished, as hereinabove described. As in the first embodiment of this invention, described above, suitable electronic circuitry may be incorporated into the electronic counter 65', so that upon calibration that instrument will continuously display a reading of the mean concentration of heavy metal ions in the liquid sample. Similarly, the continuous recorder 70' may be provided with suitable electronic circuitry, such that the output will be a continuous record of mean heavy metal ion concentration v. time.

The process of this embodiment of the present invention may be hand-operated or conducted in an automatic or semi-automatic apparatus, as shown schematically in FIG. 2. In hand operation, a discreet liquid sample is collected by the operator and filtered, whereupon the filtrate is mixed with a hydrogen peroxide solution and metered into the light scattering detector 55' by means of a syringe or similar device, after the light scattering detector 55' has been calibrated by means of a blank solution. The apparatus shown schematically in FIG. 2 may be automated or semi-automated by providing means from continuously supplying the liquid sample to the filter 20', and conduit means to conduct the filtrate to the hydrogen peroxide mixing chamber 42', which mixes the filtrate with the hydrogen peroxide solution in a continuous or programmed manner and meters the mixture through a programmed valve 44' into the light scattering detector 55'. The blank solution is dispensed from the blank solution reservoir 45' and sent through the programmed valve 50' into the light scattering detector 55', for calibration purposes. In particular, the valve 44' and the valve 50' may be programmed to intermittently calibrate the light scattering detector 55' and pass test samples into that device. The exact nature of this automatic or semi-automatic apparatus will be clear to those skilled in the art from the description herein provided.

The sensitivity of the process of this invention has been demonstrated by extensive testing. In particular, a catalase concentration of $10^{-10}$ gram per milliliter of liquid sample has been detected, as well as $10^4$ to $10^5$ cells/ml. of unstained *Bacillus globigii, Serratia marcescens* or *S. lutea*, and 500 cells/ml. of catalase-stained *B. globigii* spores. The process of the alternative embodiment of this invention has been employed to detect ferric chloride concentrations of the order of $10^{-6}$ gram per milliliter. It can be seen from these experimental results that iron in its chelated form, such as in heme (or in catalase, which contains heme), catalyzes the decomposition of hydrogen peroxide far more readily then iron in its unchelated form, such as in ferric chloride.

I claim:
1. In a method of detecting the presence of a material selected from the group consisting of a heme-containing microorganism or a heavy metal ion, the steps comprising:
   providing said material in an aqueous solution of hydrogen peroxide free of interfering contaminants capable of reacting with the hydrogen peroxide and free from particles of a size capable of scattering light;
   permitting said material to react with the hydrogen peroxide to form bubbles of oxygen in the aqueous solution;
   passing said solution into a transparent chamber;
   directing a beam of light into said transparent chamber and permitting the oxygen bubbles to scatter the light of the beam;
   monitoring the light scattered from the oxygen bubbles within said transparent chamber; and
   determining the concentration of said material from the monitored light.
2. A method in accordance with claim 1 wherein the microorganism has naturally occurring catalase.
3. A method in accordance with claim 1 wherein the microorganism is stained with catalase.

References Cited

UNITED STATES PATENTS 3,479,859  11/1969  Hager _____ 73—17 A

FOREIGN PATENTS 138,089  8/1960  U.S.S.R.
1,085,825  10/1967  Great Britain.

OTHER REFERENCES

Gaghon et al.: "Anal. Chem." 31, 144–146 (1959).

ALVIN E. TANENHOLTZ, Primary Examiner

M. D. HENSLEY, Assistant Examiner

U.S. Cl. X.R.

23—230 R; 356—208; 250—218